(12) United States Patent
Umbricht et al.

(10) Patent No.: US 8,556,026 B2
(45) Date of Patent: Oct. 15, 2013

(54) INDUSTRIAL PLANT WITH NOISE ATTENUATION HOOD

(75) Inventors: Walter Umbricht, Gebenstorf (CH); Anke Vietgen-Zeidler, Brunegg (CH)

(73) Assignee: Alstom Technology Ltd, Baden (CH)

( * ) Notice: Subject to any disclaimer, the term of this patent is extended or adjusted under 35 U.S.C. 154(b) by 18 days.

(21) Appl. No.: 13/333,685

(22) Filed: Dec. 21, 2011

(65) Prior Publication Data

US 2012/0168244 A1  Jul. 5, 2012

(30) Foreign Application Priority Data

Jan. 3, 2011 (CH) .................................... 0012/11

(51) Int. Cl.
*B64F 1/26* (2006.01)
(52) U.S. Cl.
USPC ............................................. 181/210; 415/119
(58) Field of Classification Search
USPC .......................................... 181/210; 415/119
See application file for complete search history.

(56) References Cited

U.S. PATENT DOCUMENTS

| | | | |
|---|---|---|---|
| 3,791,682 A * | 2/1974 | Mitchell | 290/2 |
| 4,199,301 A | 4/1980 | Meylan | |
| 4,214,849 A * | 7/1980 | Downing | 414/545 |
| 6,357,221 B1 | 3/2002 | Schroeder | |
| 6,477,843 B2 | 11/2002 | Schroeder et al. | |
| 6,810,991 B1 * | 11/2004 | Suzuki | 181/210 |
| 6,962,057 B2 * | 11/2005 | Kurokawa et al. | 60/796 |
| 7,221,061 B2 * | 5/2007 | Alger et al. | 290/1 R |
| 8,360,203 B2 * | 1/2013 | Waisanen et al. | 182/141 |
| 2004/0150184 A1 * | 8/2004 | Bang et al. | 280/166 |
| 2008/0131204 A1 * | 6/2008 | Pontano | 404/83 |

FOREIGN PATENT DOCUMENTS

EP  0013771 A1  8/1980

* cited by examiner

*Primary Examiner* — Forrest M Phillips
(74) *Attorney, Agent, or Firm* — Volpe and Koenig, P.C.

(57) ABSTRACT

A noise-emitting industrial plant is provided, which is enclosed by a personnel-accessible noise attenuation hood for damping noise which issues from the plant. The noise attenuation hood includes a horizontal working platform which is provided for maintenance operations and/or repair work. The working platform is arranged at the noise attenuation hood in a foldout manner.

17 Claims, 4 Drawing Sheets

INDUSTRIAL PLANT WITH NOISE ATTENUATION HOOD

RELATED APPLICATION

The present application hereby claims priority under 35 U.S.C. Section 119 to Swiss Patent application number 00012/11, filed Jan. 3, 2011, the entire contents of which are hereby incorporated by reference.

FIELD OF INVENTION

The present invention relates to the field of maintenance of industrial plants. It refers to an industrial plant with a noise attenuation hood.

BACKGROUND

In industry, there are a large number of plants which emit noise and for reasons of protection of the environment are therefore the subject of noise attenuation measures. One such measure is to cover the plant in question on all sides by a noise attenuation hood in order to correspondingly reduce noise emissions. It is self-evident that for cost reasons such a noise attenuation hood in terms of size must be dimensioned as far as possible so that it encloses the plant in question in a manner which is as space saving as possible. On the other hand, for maintenance operations and/or repair work it may be necessary to work on the plant which is enclosed by the noise attenuation hood. For this, it is frequently necessary to erect a platform on which work can be carried out on the plant with the hood open.

Special conditions prevail in this case in power plants. The power plant operator plans downtimes for its power plants each year in order to reliably maintain the power plants and also to achieve high availability and remaining running time of the power plant.

In order to minimize the costly downtime as much as possible, a detailed planning of the maintenance operations is necessary. The success of such planning is determined especially by the effectiveness of the tools used and infrastructure during the downtime. As a result of highly specialized tools and a corresponding infrastructure, the labor expenditure can be reduced, the downtime and the costs associated therewith can be reduced and safety during the downtime can be increased. The working space which is made available for the maintenance is frequently a problem which results in delays and even accidents.

In combined cycle power plants, the turbomachines (gas turbines, steam turbines) are provided with the noise attenuation hoods which are mentioned above (see U.S. Pat. No. 6,477,843 B2, for example, which is incorporated by reference) in order to limit the noise to an acceptable and legally prescribed level. For maintenance times and downtimes, parts of the noise attenuation hood must be removed in order to improve access to the plants. This requires expenditure of labor and time and employs crane systems which at the same time are urgently required elsewhere.

In order to improve the situation, a (free-standing) working platform is sometimes erected on the plant, as is schematically shown in FIG. 1. FIG. 1 shows in section a noise-emitting industrial plant (turbine plant) 30 with a noise attenuation hood 26 which encloses a turbine 11, the machine axis of which is perpendicular to the plane of the drawing and which is indicated by a circle. Details of the turbine 11, such as the support structure or the fresh air intake and exhaust gas duct, are not shown for the sake of simplicity. Inside the noise attenuation hood 26, level with the turbine 11, provision can be made for an internal walkway 13 which leads along the machine in the axial direction. For working on the turbine 11, a separate working platform 27 is now erected outside the noise attenuation hood 26 and is supported on the ground 31 by supports 28 and made safe by means of a guard rail 29. By means of corresponding openings (not shown in FIG. 1) in the noise attenuation hood 26, the working personnel can carry out the necessary work on the turbine 11 from the working platform 27.

The working platform 27 is designed so that it can support the tools, pieces of equipment, work benches, office equipment and also instruments and individual components—up to a weight of 25 kg, for example—which are necessary for the work during the disassembly and assembly processes. To this end, a carrying capacity of the working platform 27 of 500 kg/m$^2$, for example, is necessary. The removal of insulating covers, fuel lances, burners, devices and heavy bolts can thus be carried out via the working platform and not via steps which would bring along a high risk of injury. However, such working platforms are frequently not available and cannot be replaced by a construction with a scaffold either.

The described prior art therefore has the following disadvantages:

- The removal of parts of the noise attenuation hood requires considerable expenditure of labor and time
- Valuable cranage time is employed for the removal
- Erection of a separate working platform is costly
- A working platform is frequently not available
- The construction of a working platform involves additional risks of injury
- The final assembly of the noise attenuation hood is again costly in labor and time
- The parts which accumulate during scheduled maintenance operations inside the noise attenuation hood are removed via an internal working platform, which necessitates considerable expenditure of labor and time and in many cases also entails valuable cranage work, and also involves risks of injury.

SUMMARY

The present disclosure is directed to a noise-emitting industrial plant, which is enclosed by a personnel-accessible noise attenuation hood for damping noise which issues from the plant. The noise attenuation hood includes a horizontal working platform which is provided for maintenance operations and/or repair work. The working platform is arranged at the noise attenuation hood in a foldout manner.

BRIEF DESCRIPTION OF THE DRAWINGS

The invention shall subsequently be explained in more detail based on exemplary embodiments in conjunction with the drawing. In the drawings

DETAILED DESCRIPTION OF THE PREFERRED EMBODIMENTS

Introduction to the Embodiments

Figure 1:
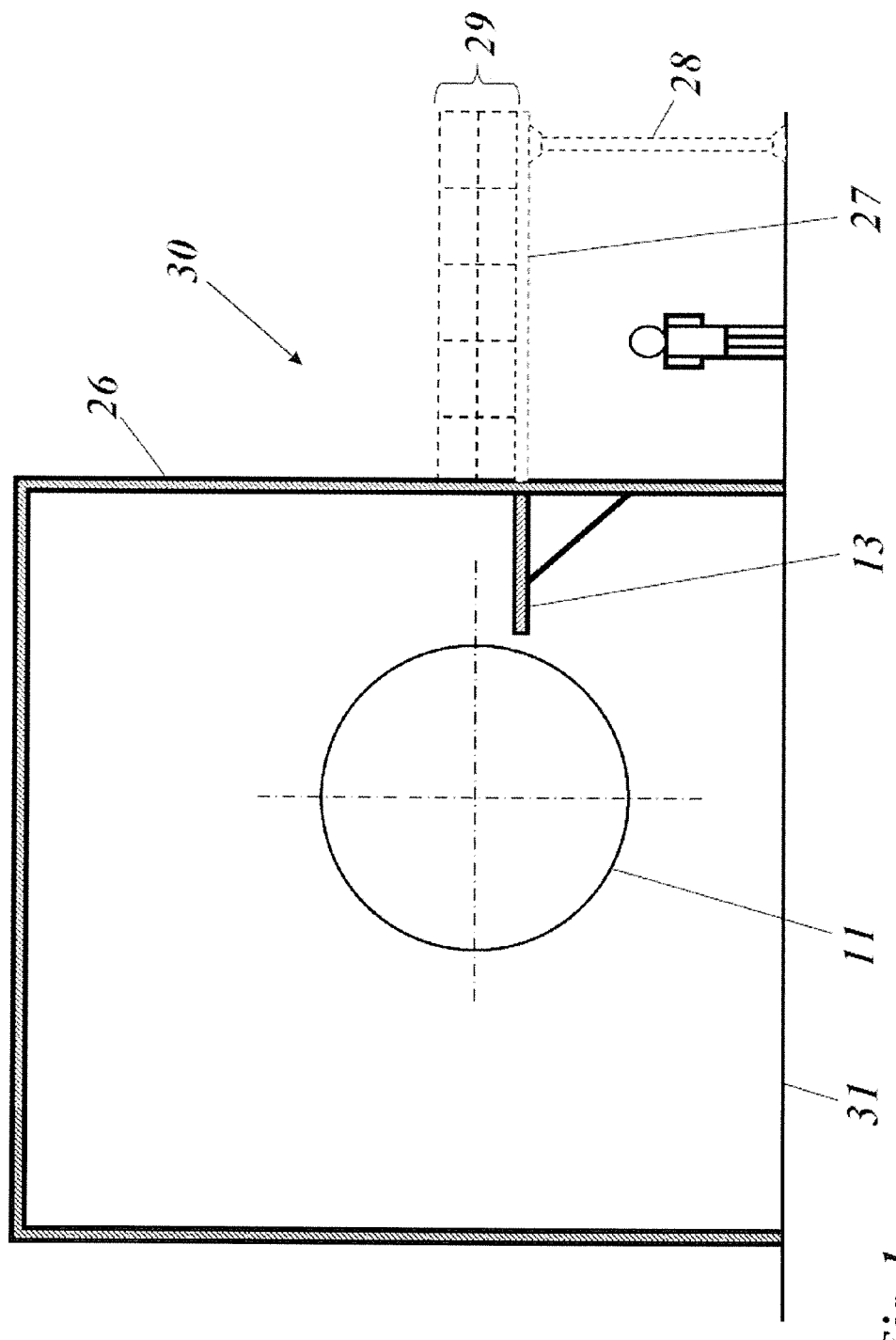
FIG. 1 shows in a greatly simplified cross-sectional schematic diagram the construction of a turbine plant with noise attenuation hood and external working platform according to the prior art.

It is therefore an object of the invention to design a noise-emitting industrial plant of the type referred to in the introduction so that the explained disadvantages of known plants are avoided, in that possible maintenance operations and repair work or downtimes are significantly shortened, in that the associated labor cost and the risk of accidents associated therewith are considerably reduced, and in that dependency upon the local infrastructure is drastically reduced.

The object is attained in accordance with the accompanying claims.

The noise-emitting industrial plant according to the invention, especially a gas turbine or steam turbine, is enclosed by a personnel-accessible noise attenuation hood for damping the noise which issues from the plant. The noise attenuation hood comprises a horizontal working platform which is provided for maintenance operations and/or repair work, and the working platform is arranged on the noise attenuation hood in a foldout manner.

In principle, it is conceivable—if the necessary space is available inside the noise attenuation hood—that the working platform can be folded out towards the inside. On account of the mostly restricted space conditions inside the noise attenuation hood, it is advantageous, however, if, according to one development of the invention, the working platform is of an outwardly foldable design. As a result of this, an appreciable surface can be made available for safe working on the platform.

It is especially advantageous and space-saving if, according to another development of the invention, the noise attenuation hood has an essentially vertical wall, and if the working platform is a foldout wall segment of this wall. By integration of the platform into the wall, little or no additional space is occupied when the platform is folded up. On the other hand, the wall segment in question must have not only the necessary noise attenuating characteristics and possibly pressure-tightness characteristics (in the case of pressure differences between external and internal spaces), but must also have the necessary mechanical stability in order to be personnel-accessible and loadable with additional equipment weight or the like. Furthermore, the folded in platform must reliably close off the noise attenuation hood.

The foldout capability can be especially simply realized if the working platform or the wall segment is connected in a foldout manner to the noise attenuation hood by means of swivel joints. The swivel joint in this case can be designed as a simple hinge with fixed hinge pin or as a double hinge in order to enable a more favorable movement characteristic in relation to the hood.

If, according to a further development of the invention, the rotational axis which is defined by the swivel joints coincides essentially with the lower transverse edge of the wall segment or of the working platform, the platform folds out from the wall only in one direction.

If, on the other hand, the rotational axis which is defined by the swivel joints extends above the lower transverse edge of the wall segment or of the working platform in such a way that the folded out working platform, by a part of its surface, reaches into the interior of the noise attenuation hood, working surfaces are made available on the inside and on the outside at the same time with the platform folded out.

In a further development of the invention, the folded out working platform has a predetermined clearance from the ground, and supports are provided between the working platform and the ground for increasing the mechanical stability in the outer regions of the working platform. As a result of this, different heights of the working platform, which are optimally adapted to the respective plant, can be realized without any difficulties.

In the simplest case, the supports can be detachably connected to the working platform. They are then provided separately when using the platform and connected to the platform in order to support this.

The device is particularly simple and independent of the infrastructure at site, however, the supports can be fastened on the working platform in a foldout manner, especially integrated into the working platform.

For increasing safety, it is expedient if the working platform can be made safe against the falling of personnel working on the working platform by a guard rail.

In this case also, the guard rail can be provided separately and releasably connected to the working platform.

It is particularly advantageous, however, if the guard rail is fastened on the working platform in a foldout manner, especially integrated into the working platform.

So that the wall segment in the folded in state terminates as satisfactorily as possible with the wall, it is advantageous if noise insulation and/or pressure sealing are provided between the wall segment or the working platform and the part of the wall enclosing it.

DETAILED DESCRIPTION

The problem, which is referred to in the introduction, of the unavailable working platform, or working platform which is to be only laboriously constructed, for working on a noise-emitting industrial plant which is covered by a noise attenuation hood, can be solved in a simple manner if the noise attenuation hood according to the present invention is already equipped with a corresponding foldout working platform. If necessary, this working platform is simply folded out and then, without further effort, can be used for maintenance operations or repair work on the plant. It is particularly advantageous if the working platform is integrated into a wall of the noise attenuation hood and can be swung out of the wall. In this case, by swinging out the working platform the necessary opening in the noise attenuation hood is created at the same time, through which the working personnel can work on the plant. In this way, not only the construction of a working platform but also the partial removal of the noise attenuation hood for the purpose of access is dispensed with.

Figure 2:
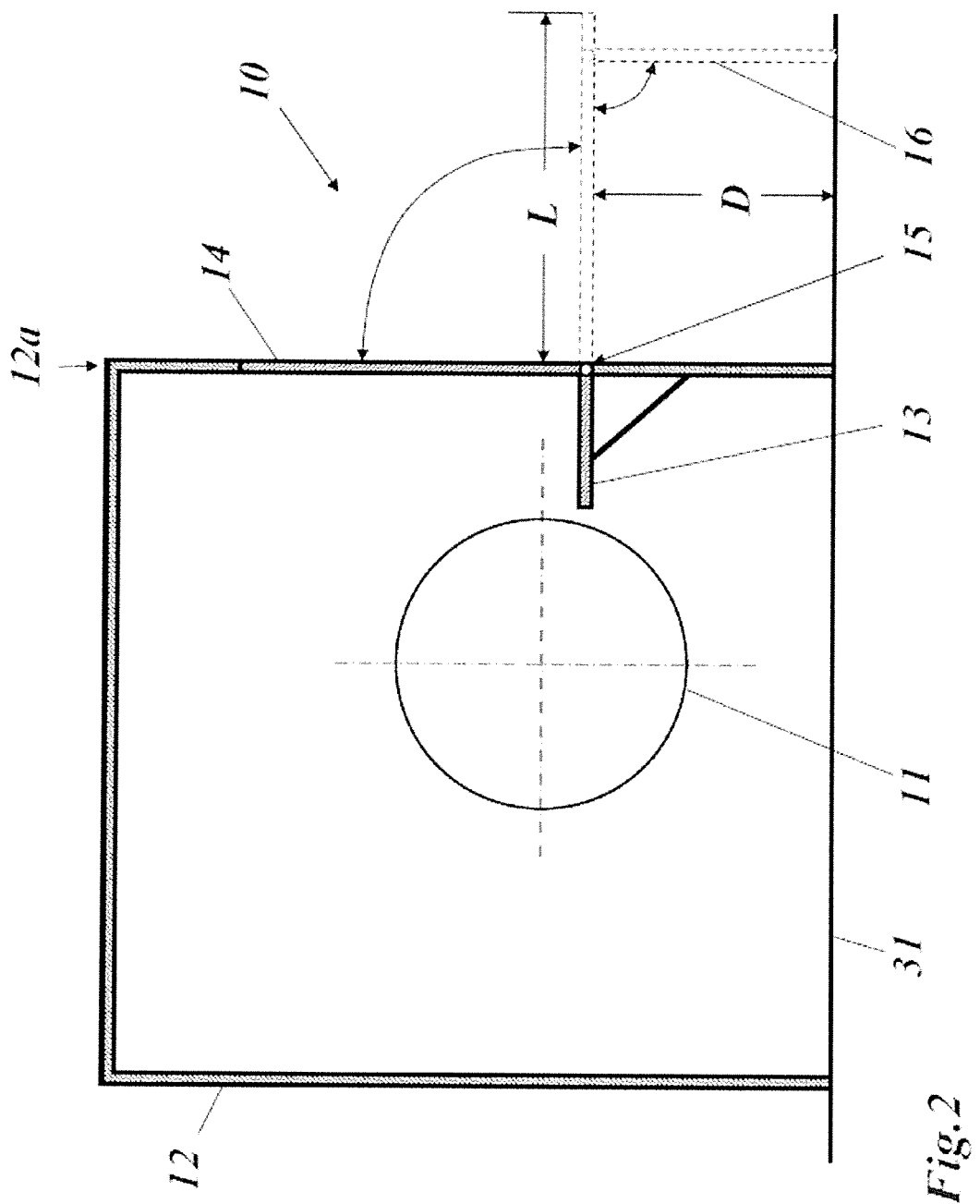
FIG. 2 shows in a view comparable to FIG. 1 a noise attenuation hood with integrated foldout working platform according to an exemplary embodiment of the invention.
Figure 3:
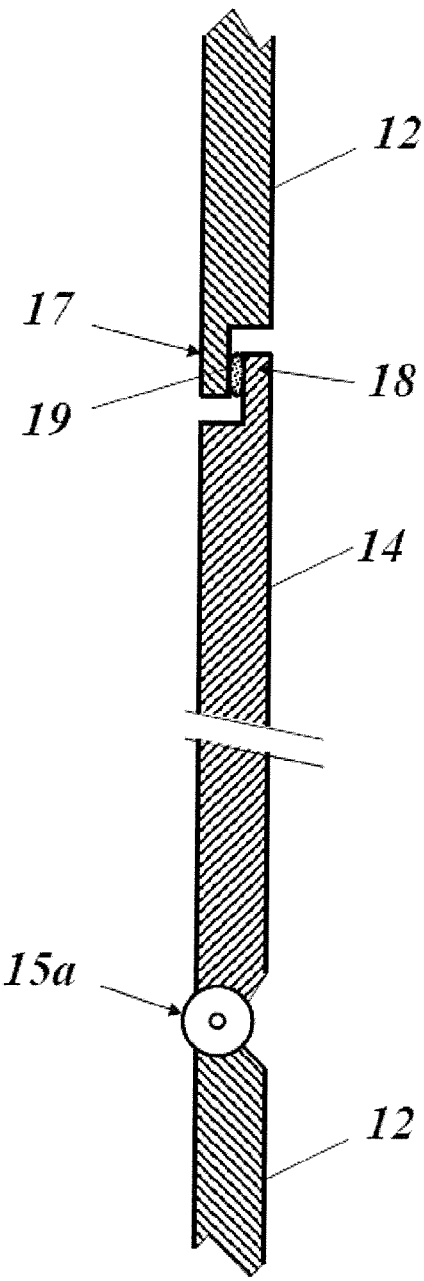
FIG. 3 shows in detail a foldout integrated working platform according to FIG. 2 with a simple hinge as a swivel joint.
Figure 4:
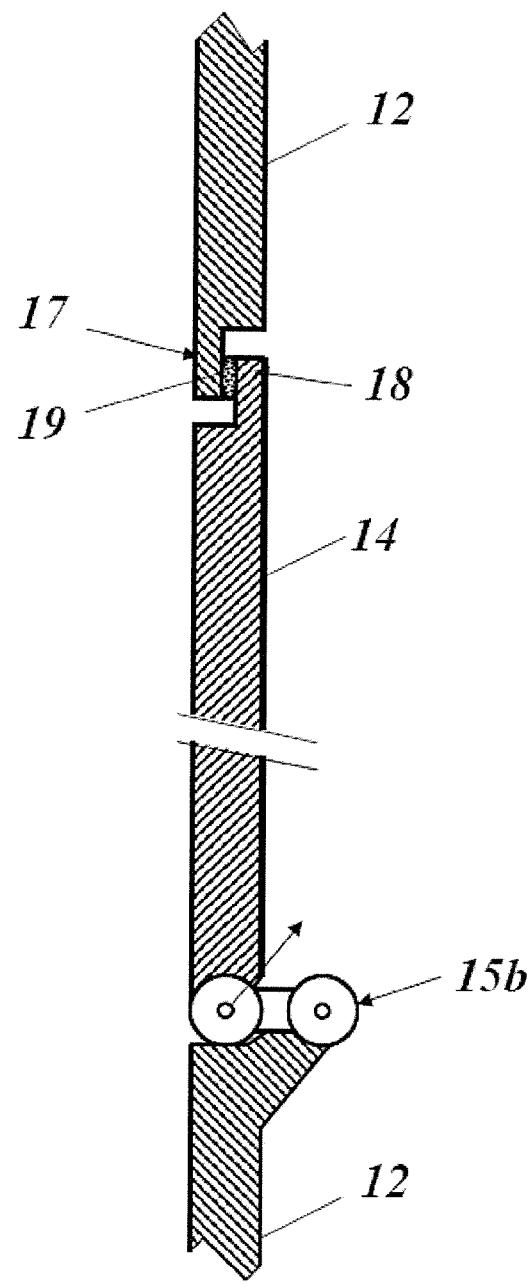
FIG. 4 shows in detail a foldout integrated working platform according to FIG. 2 with a double hinge as a swivel joint.

Shown in FIG. 2 is a noise-emitting industrial plant 10 with a noise attenuation hood 12, the plant comprises a turbine 11, for example a gas turbine. The noise attenuation hood 12 has an essentially vertical wall 12a, also an internal walkway 13 along the turbine 11 is attached on the inner side. Above the walkway 13, a wall segment 14 in the wall 12a can be used, due to its mechanical stability, as a working platform and for this purpose can be folded out into the position indicated by dashed lines by means of a swivel joint 15 which is arranged on the lower transverse edge. If the wall segment or the working platform 14 is folded out, a corresponding opening remains behind in the wall 12a, through which personnel can find their way from the working platform 14, at the same level, into the interior of the noise attenuation hood 12 to the walkway 13. The clearance D of the working platform from the ground 31 can be several meters (for comparison, see the size of the person drawn in as a pictogram in FIG. 1). The swivel joint 15, according to FIG. 3, can be designed as a simple hinge 15a, or, according to FIG. 4, as a double hinge 15b in order to be better able to lift the wall segment 14 from the wall 12a.

In the folded in state, the wall segment or the working platform 14 is locked in the wall 12a by means of a suitable locking mechanism, not shown in FIG. 2, which is unlocked for folding out. The wall segment 14 can then be swung by 90° into the horizontal folded out position (see the double arrow in FIG. 2) by means of a foldout device which can be constructed as a cable winch or driven hydraulically or electrically, or by means of a crane which is provided in the hall. In the outer regions of the working platform 14, supports 16 (or 16a, 16b in FIG. 6) can then be provided between platform and ground 31 for support.

Figures 5, 6:
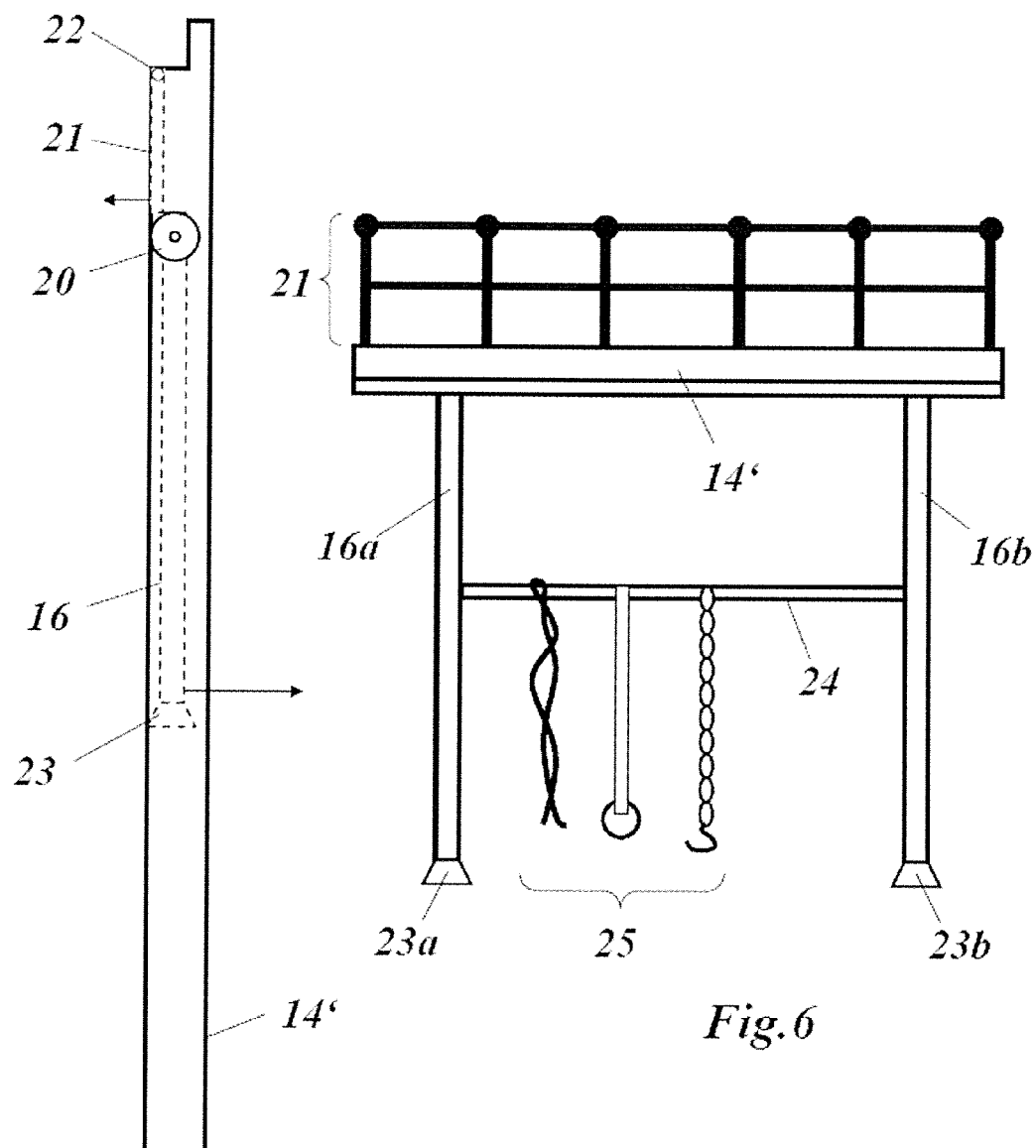
FIG. 5 shows a working platform according to FIGS. 2-4 with integrated foldout supports and integrated foldout guard rail according to another exemplary embodiment of the invention.
FIG. 6 shows in a side view from the front the folded out working platform with a device for keeping necessary working means in readiness.

The supports 16 or 16a, 16b can be releasably connected to the working platform 14 (or 14' in FIG. 6). They are then separately kept in readiness and erected before the working platform 14 or 14' is swung out by 90° from the wall 12a. The supports 16, 16a 16b, however, can also be fastened on the working platform 14, 14' in a foldout manner. They are then available at any time when the working platform 14, 14' is put into service, take up no space in the folded in state, and considerably reduce the time for putting into service. It particularly saves space if the supports 16 or 16a, 16b, according to FIG. 5, are integrated into the working platform 14 or 14' and can be swung out from the wall segment by means of swivel joints 20. Widened feet 23 or 23a, 23b on the bottom end of the supports 16 or 16a, 16b ensure a secure standing on the ground 31 in this case.

Similar considerations also apply to a guard rail (21 in FIG. 6) which makes the working platform 14, 14' safe against the falling off of personnel working on said working platform 14, 14'. Such a guard rail 21 can be kept in readiness separately and releasably connected to the working platform 14, 14', for example can be plugged in or screwed on. However, for simplification and for saving time it can also be fastened on the working platform 14, 14' in a foldout manner. It is particularly favorable if the guard rail 21, according to FIG. 5, is integrated into the working platform 14, 14' and by means of a swivel joint 22 is of a foldout design.

In the example of FIG. 5, the rotational axis which is defined by the swivel joints 15 coincides essentially with the lower transverse edge of the wall segment or of the working platform 14, 14'. When the wall segment 14 or 14' is folded out, a folded out working platform is then available only on the outside. It is also conceivable, however, that the rotational axis which is defined by the swivel joints extends above the lower transverse edge of the wall segment or of the working platform 14, 14' in such a way that the folded out working platform 14, 14', by a part of its surface, reaches into the interior of the noise attenuation hood 12. In this case, the separate walkway 13 which is shown in FIG. 2 could be part of the folded out working platform, which leads to further simplifications.

In order to ensure the necessary soundproofing with the wall segment folded in, it is advantageous if sound insulation is provided between the wall segment or the working platform 14, 14' and the part of the wall 12a enclosing it and—if a pressure difference (of 10-20 mbar, for example) prevails between the interior of the noise attenuation hood 12 and the outside space—a pressure sealing device is provided. For this, the edge regions of the wall segment 14 and of the opening in the wall 12a which accommodates it are formed as mutually overlapping rabbets 17 or 18, between which a seal 19 is additionally arranged.

Finally, devices for storing and having in readiness working implements which are required for the maintenance, such as cables, chains, straps, hooks, shackles, eyebolts, etc., can be provided on the working platform 14 or 14' in order to spare the working personnel from unnecessary trips and to improve safety in respect to the working implements. According to FIG. 6, a cross-rail 24, for example, can be arranged between the supports 16a and 16b for storing the working implements 25.

The dimensions of the working platform 14 or 14' are designed carefully for each plant. Care is to be taken that the access of lorries and forklift stackers is not hindered and that adequate storage space is available for storing large and heavy components of the plant, such as turbine rotors or turbine casings. For a type GT26 gas turbine of the Assignee of the present application, the working platform 14, 14' would have a length L (FIG. 2) of 10 m and a width of about 5 m, for example, as standard. The working platform according to the invention is ready for use within less than an hour. It reveals its advantages particularly in unforeseen situations of an unplanned maintenance or of a sudden failure of the plant (gas turbine) if the sequences of work and provision of the infrastructure are not able to be planned in advance. The working platform in these cases allows the quick provision of that which is most essential in order to be able to commence immediately with the dismantling operations on the plant.

Using the working platform according to the invention, unnecessary preliminary operations, the employing of cranes and safety risks are avoided. In particular, safety is achieved within a few minutes and under control. As soon as the platform is located in its folded out horizontal position, steps and handrails or guard rails can be quickly added for easy and safe access to the platform and handling of the platform.

Using the invention, considerable savings in labor and time are achieved overall with a high level of safety.

LIST OF DESIGNATIONS 10, 30 Noise-emitting industrial plant
11 Turbine (gas turbine, for example)
12, 26 Noise attenuation hood
12a Wall (vertical)
13 Walkway (internal)
14, 14'Wall segment/working platform
15 Swivel joint
15a Hinge
15b Double hinge
16, 28 Support
16a, 16b Support
17, 18 Rabbet
19 Seal
20, 22 Swivel joint
21, 29 Guard rail
23 Foot
23a, 23b Foot
24 Cross-rail
25 Working means
27 Working platform
23 Ground
D Ground clearance of working platform
L Length

What is claimed is:

1. A noise-emitting industrial plant (10), which is enclosed by a personnel-accessible noise attenuation hood (12) for damping noise which issues from the plant, the noise attenuation hood (12) comprising a horizontal working platform (14, 14') which is provided for at least one of maintenance operations or repair work on the noise-emitting industrial plant (10), the working platform (14, 14') is arranged at the noise attenuation hood (12) in a foldout manner.

2. The noise-emitting industrial plant as claimed in claim 1, wherein the working platform (14, 14') is of an outwardly foldable design.

3. The noise-emitting industrial plant as claimed in claim 1, wherein the noise attenuation hood (12) has an essentially vertical wall (12a), and the working platform (14, 14') is a foldout wall segment of the wall (12a).

4. The noise-emitting industrial plant as claimed in claim 3, wherein the working platform or the wall segment (14, 14') is connected to the noise attenuation hood (12) in a foldout manner by at least one swivel joint (15).

5. The noise-emitting industrial plant as claimed in claim 4, wherein the rotational axis which is defined by the at least one swivel joint (15) coincides essentially with the lower transverse edge of the wall segment or of the working platform (14, 14').

6. The noise-emitting industrial plant as claimed in claim 4, wherein the rotational axis which is defined by the swivel joints extends above the lower transverse edge of the wall segment or of the working platform (14, 14') in such a way that the folded out working platform (14, 14'), by a part of its surface, reaches into an interior of the noise attenuation hood (12).

7. The noise-emitting industrial plant as claimed in claim 1, wherein the folded out working platform (14, 14') has a predetermined clearance (D) from the ground (31), and in that supports (16, 16a, 16b) are provided between working platform (14, 14') and ground (31) for increasing the mechanical stability in an outside regions of the working platform (14, 14').

8. The noise-emitting industrial plant as claimed in claim 7, wherein the supports (16, 16a, 16b) are releasably connected to the working platform (14, 14').

9. The noise-emitting industrial plant as claimed in claim 7, wherein the supports (16, 16a, 16b) are fastened on the working platform (14, 14') in a foldout manner.

10. The noise-emitting industrial plant as claimed in claim 9, wherein the supports (16, 16a, 16b) are integrated into the working platform (14, 14').

11. The noise-emitting industrial plant as claimed in claim 1, wherein the working platform (14, 14') further comprises a guard rail (21).

12. The noise-emitting industrial plant as claimed in claim 11, wherein the guard rail (21) is fastened on the working platform (14, 14') in a foldout manner.

13. The noise-emitting industrial plant as claimed in claim 12, wherein the guard rail (21) is integrated into the working platform (14, 14').

14. The noise-emitting industrial plant as claimed in claim 3, wherein at least one of sound insulation or pressure sealing (17-19) are provided between the wall segment or the working platform (14, 14') and a part of the wall (12a) enclosing it.

15. The noise-emitting industrial plant as claimed in claim 4, wherein the at least one swivel joint (15) is configured as a hinge (15a) or as a double hinge (15b).

16. The noise-emitting industrial plant as claimed in claim 1, wherein the plant is a gas turbine or steam turbine (11) plant.

17. A noise-emitting industrial plant (10), which is enclosed by a personnel-accessible noise attenuation hood (12) for damping noise which issues from the plant, the noise attenuation hood (12) comprising a working platform (14, 14') which is provided for at least one of maintenance operations or repair work on the noise-emitting industrial plant (10), the working platform (14, 14') is arranged as a part of the noise attenuation hood (12) in a foldout manner and when the working platform is folded out from the noise attenuation hood (12) it is situated at a predetermined clearance (D) from the ground (31).

* * * * *